(12) United States Patent
Mälkki et al.

(10) Patent No.: US 6,582,509 B2
(45) Date of Patent: Jun. 24, 2003

(54) ORGANIC PIGMENT AND A METHOD FOR ITS PREPARATION

(75) Inventors: Yrjö Mälkki, Espoo (FI); Reko Lehtilä, Lohja (FI)

(73) Assignee: Aveno Oy, Helsinki (FI)

( * ) Notice: Subject to any disclaimer, the term of this patent is extended or adjusted under 35 U.S.C. 154(b) by 0 days.

(21) Appl. No.: 10/128,335

(22) Filed: Apr. 24, 2002

(65) Prior Publication Data

US 2002/0144629 A1 Oct. 10, 2002

Related U.S. Application Data

(63) Continuation of application No. PCT/FI00/00954, filed on Feb. 2, 2000.

(30) Foreign Application Priority Data

Nov. 2, 1999 (FI) .............................................. 19992365

(51) Int. Cl.⁷ ..................... C08K 15/1545; C08B 30/06
(52) U.S. Cl. .................... 106/493; 106/498; 106/206.1; 106/209.1; 106/215.1; 106/215.3; 106/217.01
(58) Field of Search ........................... 106/206.1, 209.1, 106/215.1, 215.3, 217.01, 493, 498

(56) References Cited

U.S. PATENT DOCUMENTS

| | | | |
|---|---|---|---|
| 4,187,219 A | 2/1980 | Maher | 260/17.4 |
| 4,500,546 A | 2/1985 | Turbak et al. | 514/781 |
| 5,573,636 A | 11/1996 | Sack et al. | 162/5 |
| 5,925,380 A | 7/1999 | Roulier et al. | 424/489 |

FOREIGN PATENT DOCUMENTS

| | | |
|---|---|---|
| EP | 0 426 391 | 5/1991 |
| GB | 734134 | 7/1955 |

OTHER PUBLICATIONS

Huber, Kerry C. et al., "Visualization of Channels and Cavities of Corn and Sorghum Starch Granules," Cereal Chem. 74(5):537–541, 1997 (Abstract) no month provided.

Primary Examiner—David Brunsman
(74) Attorney, Agent, or Firm—Pennie & Edmonds LLP

(57) ABSTRACT

The invention relates to a method for preparing an organic pigment from starch, and the pigment thus received. According to the invention, starch granules are swollen to increase their volume and plasticity, their stability towards changes in volume and shape is improved by cross-linking, by derivatization, or by making the surface hydrophobic, after which gas bubbles or cavities are formed inside the granules, these bubbles or cavities having a strong light scattering effect. Generating bubbles or cavities can be performed by evaporating water or another liquid, by releasing impregnated gas, by a gas generating reaction, or by displacing absorbed water with a solvent. The product is useful as a white pigment especially in coating of starch, in paints and in cosmetic products.

29 Claims, No Drawings

ORGANIC PIGMENT AND A METHOD FOR ITS PREPARATION

This application is a continuation of PCT/FI00/00954 filed Feb. 2, 2000.

FIELD OF THE INVENTION

The object of this invention is a new method to prepare organic pigment and the new pigment obtained by this method. This pigment is useful especially as a component for increasing whiteness and opacity of various products.

BACKGROUND OF THE INVENTION

Conventionally, pigments used for increasing whiteness and opacity in paper coating, paints, cosmetic products and for comparable purposes are composed of inorganic materials. Their use impairs recycling of materials, because when the content of the pigments in a material exceeds certain limits, organic material being the carrier or binder of the pigment cannot be burned without a supporting fuel, or without other special arrangements, and the material does not decompose biologically in dumping. Inorganic pigments increase the gravity of the pigmented material and thus freight costs of the final product. Some inorganic pigments contain heavy metals and thus are not applicable in living environment.

Organic pigments have been developed for these purposes mainly based on styrene-butadiene and urea-formaldehyde raw materials, and they have been marketed as latex preparations. These raw materials, too, are combined with environmental difficulties, since they are not decomposed biologically, and for their safe and innocuous burning, high temperatures are necessary. Some latexes marketed function mainly as components giving gloss and without affecting whiteness or opacity. As a white organic pigment, latex composed of hollow particles of styrenebutadiene polymer, such as the product ROPAQUE or Rohm & Haas company, has been marketed. Light scattering of such particles are based on an air bubble in the hollow space, the diameter of which is said to be 0.8 $\mu$m. Theoretical calculations have shown, that light scattering from air or gas bubbles in an organic material is the strongest when the diameter of the bubble is of the same order of magnitude as the wavelength of light.

Of the renewable natural raw materials, starch, among others, scatters in dry state light strongly and is sensed white. As with other materials, light scattering is the stronger, the finer the material, and thus stronger for the small-granular than for large-granular starches. So far the common opinion has been that light scattering occurs from the surfaces of the granules. When starch is suspended in water or other liquid, light scattering properties are significantly decreased.

When inorganic pigments are mixed in gelatinized starch, as in paper coating paste, there is a difference on the interface in the refractive index between the pigment and the binding material, and thus light is either reflected or refracted depending on the contact angle. When starch granules are mixed in starch, refractive indices are the same or nearly the same on both sides of the interface, and thus no reflection or refraction occurs on such an interface. Starch granules cannot thus be used as such as pigments in applications, where the binding material is starch, as it is in paper coating. Their pigmenting effect is also weak when mixed in organic liquids such as oils or solvents, due to a small difference in the refractive index.

Starch and starchy materials have been swelled in several industrial operations, for example in cooking extrusion and in popping corn. In these operations, a starchy material containing water is suddenly heated under pressure to temperatures above 100° C., and the pressure is suddenly released, causing a swelling of the material due to the water vapour generated. However, at the temperatures and water contents used in these operations starch is gelatinized. The magnitude of pores formed is usually a few millimetres and thus not in the range optimal for light scattering. Since starch in the walls of these bubbles is gelatinized, the bubbles are not stable when in contact with water.

In the method according to U.S. Pat. No. 5,925,380, one or several thermoplastic synthetic monomers with ethene unsaturated bonds are added in starch, and the mixture is heated at temperatures where starch is not gelatinized. The said monomers are polymerized forming hollow particles. Their content is 2–30% of the final product; the particle size is 1–100 $\mu$m, and the density in general below 0.1 g cm$^{-3}$. According to these figures, the pores of the smallest particles could be in the size range of the strong light scattering, but there is in the patent no mention of light scattering properties.

Surprisingly it has now been observed, that dry starch particles have sometimes brightly light scattering spots, where the light scattering is manyfold as compared to the surface of a starch granule. Such spots have been observed both in starch samples dried rapidly using the so-called flash drying, and in slowly dried starch samples. The light scattering spot is often in the amorphic centre of the granule, but such spots seem to occur also on the surface of granules. When the sample is contacted with water or another liquid, the light scattering is weakened or disappears, often irreversibly. Especially heating in the presence of large amounts of water leads to disappearing of light-scattering spots. In analogy with the said hollow organic pigments one can assume, that the light scattering would be caused by air bubbles formed or remaining in the granules or on their surface as the granules are dried. For the irreversible disappearance or weakening of the light scattering, two possible reasons seem to be evident. Firstly, when the granules are moistened, the said hollow cavities or air bubbles are filled with water, and material dissolved or suspended in water fills these cavities. Secondly, when the granule is dried, it may shrink in such a way that no new cavity is formed. Correspondingly, heating in the presence of water effects gelatinization of starch, and in this connection a disruption of the granule structure.

SUMMARY OF THE INVENTION

In the research on this invention it has now been found, that it is possible to form in starch granules cavities or gas bubbles, which cause a strong light scattering and are stable in contact with water and/or in short-time heating. The amount of the cavities or bubbles can be significantly higher than what is formed spontaneously in drying processes, thus resulting in effective light scattering.

DETAILED DESCRIPTION OF THE PREFERRED EMBODIMENTS

It can be calculated on the basis of the theoretical knowledge on light scattering, and also on analogy with other light scattering particles, that light scattering of a cavity or air bubble surrounded by starch is increased when its diameter is decreasing. It has a maximum close to the wavelength of light. Consequently, this phenomena can be exploited under the following preconditions: 1) by increasing the appearing of the bubbles or cavities to a significant frequency, 2) by bringing the mean size of the bubbles or cavities as close as possible to the wavelength of light, 3) by reinforcing the walls of bubbles or cavities in a way to maintain them gas-filled or prevent from collapsing also when the starch granule is contacted with water, 4) by concentrating the formation of bubbles or cavities as far as possible close to the surface of the granules, where the intensity of the incoming light is greatest.

Starch granules when dry are dense, and in part crystallized. A precondition for the formation of bubbles or cavities is swelling in water, which also makes the granule more plastic in its rheological behaviour. Unheated starch granules can be swollen below the gelatinization temperature to a 2–3-fold volume or even more without altering the shape or structure of the granule. It has been now found, that in the starch plasticized in the said way, bubbles or cavities can be formed, for instance, by 1) causing a liquid inside the granule or near to its surface to evaporate rapidly, 2) by impregnating into the granule a gas which is rapidly released from it, 3) with the aid of a gas-evolving chemical reaction, or 4) by removing water imbibed during swelling the granule by displacing it with a solvent. When a liquid is evaporated or a gas is released slowly, only a minor amount of bubbles or cavities are formed.

In a non-modified starch, bubbles or cavities formed are easily collapsed when the granule is dried and shrinks to its original volume. The collapsing can be however prevented by stabilizing the granules while still swollen, in such a way that the granules maintain the expanded outer dimensions.

According to the invention, a method is thus achieved for preparing a new organic pigment from starch, based on chemical and/or physical modification of starch. With the aid of these modifications, strongly light scattering cavities or gas bubbles are formed within starch granules, and these bubbles or cavities will be preserved under application conditions of the pigments. In addition, the invention includes a new starch-based pigment. Essential characteristics of the invention are presented in the claims attached.

Stabilization of the granules can be successfully implemented by cross-linking, using methods and reagents known as such, for instance using glyoxal or epichlorohydrin. The degree of cross-linking and its localization has to be optimized according to the objectives. Especially in starch granules irregular in shape and multiangular, such as oat starch, cross-linking is strongest at the edges of the granule. When the granule dries, these edges maintain their shapes and dimensions, while the less cross-linked parts of the granule remain plastic, which leads during the drying to a shrinking of the less cross-linked parts and drawing back towards the centre. When the cross-linking is optimal in the entire outer part of the granule, the outer shape and dimensions of the swollen granule are maintained while drying, and in the interior cavities are formed, the volume of which corresponds to the amount of water removed. A high degree of cross-linking weakens the plasticity of the starch, and bubbles or cavities are not formed especially in the surface layers where the cross-linking is highest. Cross-linking also elevates the gelatinization temperature and thus improves the stability of the structure when heated.

Using transmission electron microscopy it has been verified, that a part of the cavities arising are opened to the surface of granule, and they have evidently functioned as pathways for escaping of water vapour or gases. A part of the cavities do not reach the granule surface, and thus they cannot be filled with liquid when the granule is in a short contact with water, starch paste or a solvent. The diameter of the cavities varies favourably within the range 0.1–0.8 $\mu$m, and their length within the range 1–5 $\mu$m. The diameter is thus on the optimal range of light scattering. It is to be expected, that at least the cavities which remain closed have light scattering properties, but that due to surface tension forces also the cavities opening to the surface remain air-filled in water contacts, at least of short-duration, and thus participate in the light scattering.

Maintaining the cavities air-filled can be improved by treating the granules after the cavities or bubbles have been formed with hydrophobic chemicals, for example by acetylating the surface layer using acetic anhydride, by another derivatization including graft copolymerization, or by coating the granules with a thin layer of a hydrophobic chemical such as acetyl monoglyceride. These alternative ways to stabilize granules can be used either separately or for complementing the cross-linking treatment of starch.

Cross-linking affects the formation and adds stability of bubbles when the amount of the chemical is within the limits 0.5–5% of the amount of starch. The degree of cross-linking of starch can be 0.5–6%, optimally about 2–3%. Cross-linking can be performed in acidic, neutral or alkaline conditions. The best results have been obtained by treatments in alkaline conditions. For controlling alkalinity, carbonates can be favourably used, this also enabling evolution of gas when drying or under the influence of an acid. Swelling before cross-linking is performed at temperatures below the gelatination temperature. Thus, for example, for oat starch, the gelatinization of which starts at about 55° C., the most favourable swelling temperature is 45° C. Swelling at a too high temperature leads to a partial breakdown of the granules or to damaging of their surfaces. Swelling and cross-linking can also be performed simultaneously. When dry starch is added to water containing a cross-linking reagent a part of the chemical can penetrate inside the starch granule through micropores present in the granule, and the cross-linking can thus be more homogenous.

Generation of bubbles or cavities is most advantageous to perform at a stage when starch is already partly cross-linked, but still plastic enough for forming bubbles. Besides the degree of cross-linking, plasticity is affected also by temperature. The simplest way for forming bubbles is to evaporate water or other solvent, such as ethanol, methanol, ether, or acetone present or imbibed in the granules. This can be performed either by subjecting the cross-linked starch material containing water or another solvent to a subatmospheric pressure, or by elevating rapidly its temperature, for instance in a drying equipment. Correspondingly, bubbles can be formed from a chemical imbibed in the granules, such as carbonates, by elevating the temperature, by changes of pressure, or with the aid of acids. Formation of cavities is most simply performed by swelling starch granules, cross-linking them or stabilizing by derivatization including graft copolymerization, and subsequently removing the water rapidly by drying or by displacing it with another solvent.

Formation of bubbles or cavities can best be observed with light microscopy performed by illuminating from the direction of the objective. Bubbles and cavities are then observed as bright spots with an apparent diameter of 0.5–1.5 $\mu$m, but due to the halo effect of the strong light scattering, the real diameter of the largest bubbles cannot be exactly measured in light microscopy. In scanning electron microscopy, only traces of broken bubbles on the surface of granules have been observed. Their diameters have been 0.3–1.5 $\mu$m. Despite the bubble formation, the main part of the granules have a smooth surface thus indicating that the bubbles and cavities are in the deeper layers of the granules.

Starch granules are white in the native state and also after being modified by means described above, and thus they form a white pigment. The pigment can, however, be transformed by staining to have another colour, according to needs of particular applications.

The principles and implementation of the invention are elucidated in the following examples. Examples 1 and 2 elucidate the swelling of starch granules and formation of bubbles in the granules. In the subsequent examples, stabilization of the granules has been performed in addition. As the starting material, oat starch has been used in the examples, but the method can also be applied by using other starches as raw materials.

Example 1

Oat starch was swollen by heating it in water at 60° C. during 12 minutes. In a microscopic examination using illumination from the direction of the objective, the volume of granules had grown to 3–4 fold from the original volume. Water was displaced by 92% (weight per weight) ethanol, and ethanol with ether, after which starch was dried at room temperature. In a microscopic examination performed after ether had evaporated, 1 to 10 gas bubbles or cavities per granule were found. When such granules were suspended in glycerol, light scattering disappeared, and when suspended in oil, 1 to 3 bubbles were observed in more than 50% of the granules. The size of the bubbles was 0.5–3 $\mu$m, the largest of them were longitudinal. For comparison, dry non-treated oat starch was microscopically examined. In nearly each granule, there was in the centre of the granule a cavity or a gas bubble, which scattered light more intensively than the other parts of the granule, but light scattering of all bubbles or cavities disappeared after suspending in water.

Example 2

The heat treatment described in Example 1 was repeated by heating in water at 60° C. for 5 minutes. By centrifugal separation it was found, that 2.68 g water/g starch was bound. Water was displaced with ethanol using two subsequent treatments. After centrifugation, the ethanol content of the starch was 1.47 g/g. Ethanol was displaced by ether, and the sample was air dried at room temperature. In microscopic examination immersed in oil nearly all granules had bubbles or cavities with a size of 0.5–3 $\mu$m. Transmitted light darkened at these spots indicating that light was reflected towards the direction of illumination. In illumination from the sides, bubbles or cavities reflected light brightly.

Example 3

Oat starch was swollen by incubating it in water at 70° C. for 5 minutes, and this was followed by cross-linking by adding glyoxal, 1, 2, 3, 4, or 5% from the weight of starch. Excess water was removed by centrifugation, and the damp sample having a temperature of 60° C. was subjected to vacuum during 30 minutes. In microscopic examination using illumination from the direction of objective, light scattering bubbles or cavities were found in all of the samples treated. They were most frequent in the sample with 3% cross-linking. In this sample, more than 95% of the granules had 1 to 8 bubbles or cavities with diameters from 0.3 to 0.8 $\mu$m. When suspended in water, light scattering was best preserved in the 3% cross-linked sample. In all samples, even the darkened bubbles or cavities recovered, after drying at room temperature, their light scattering ability to a level which was superior to that of the starting material. The light scattering ability was fully recovered, when the sample was redried by displacing water with ethanol and ethanol with ether.

Example 4

0.2 g of 3% cross-linked and vacuum treated starch prepared according to Example 3 was mixed with 4 ml of acetic anhydride, 1 ml pyridine was added, and the mixing was continued at room temperature for 19 hours. Starch was separated from the reagents by centrifuging and washed three times with ether. The treatment reduced the aggregation tendency of the granules. After contacting with water and air drying, the light scattering ability of the granules was maintained unaltered.

Example 5

Cross-linking of 3% according to Example 3 was performed by simultaneously leading a mixture of carbon dioxide and air into the reaction vessel. Drying of the sample was performed under vacuum, by intermittently leading the said gas mixture into the vessel, and by repeating the vacuum treatment. In microscopic examination it was found that leading the gas mixture increased the amount of gas bubbles, their size and light scattering.

Example 6

Stable air-filled light scattering cavities were formed in starch granules by cross-linking it under alkaline conditions at 45° C. with epichlorohydrin. The reaction was performed in water phase by adding to the reaction mixture at 45° C. and pH 8.70, epichlorohydrin in an amount which was 2% of the amount of starch. The reaction mixture was allowed to cool at room temperature during 40 minutes, after which it had a pH of 9.1 and a temperature of 23.4° C. Water was removed from the mixture by centrifugation. The product was air dried on glass plate, and had already a significant amount of light-scattering cavities. Light scattering was intensified when the damp sample was treated in vacuum at 50° C., or water was displaced by ethanol and ethanol by ether, or by displacing water with acetone.

Example 7

For improving water resistance of light scattering granules, starch cross-linked to 2% by glyoxal and dried by ethanol and ether treatments was mixed in a 10% solution of acetyl monoglyceride in hexane, continuing the mixing under 5 minutes, and removing the liquid by decanting. In the following microscopic examination of the starch granules immersed in water it was found, that all granules were coated with a hydrophobic layer of acetyl monoglyceride. The light reflection of individual granules seemed to remain unaltered, although the glyceride layer diminished the total reflection observable. After drying the granules were found to having remained intact under the contact with water.

What is claimed is:

1. A method for preparing an organic pigment comprising dried swollen starch granules having cavities filled with a gas comprising:

swelling starch granules by contacting the starch granules with a first liquid to provide swelled starch granules;

stabilizing the swelled starch granules; and forming cavities filled with gas in the swelled starch granules by removing the first liquid from the swelled starch granules to provide an organic pigment of dried swollen starch granules having cavities filled with a gas.

2. The method of claim 1, wherein swelling the starch granules provides swelled starch granules that have a volume that is between 2 and 4 times larger than the volume of the starch granules.

3. The method of claim 1, wherein the first liquid is water at a temperature that is below the gelatinization temperature of the starch granule.

4. The method of claim 1, wherein removing the first liquid from the swelled starch granules comprises rapidly evaporating the first liquid.

5. The method of claim 4, wherein rapidly evaporating the first liquid comprises subjecting the swelled starch granules to subatmospheric pressure.

6. The method of claim 4, wherein rapidly evaporating the first liquid comprises heating the swelled starch granules.

7. The method of claim 1, wherein removing the first liquid from the swelled starch granules comprises contacting the swelled starch granules with one or more second liquids that is more volatile than the first liquid and evaporating the second liquid.

8. The method of claim 7, wherein the second liquid is selected from methanol, ethanol, ether, acetone, and mixtures thereof.

9. The method of claim 1, wherein forming the cavities filled with gas further comprises releasing a gas from the first liquid.

10. The method of claim 9, wherein the gas comprises carbon dioxide or a mixture of carbon dioxide and air.

11. The method of claim 1, wherein stabilizing the swelled starch granules comprises contacting the swelled starch granules with a cross-linking reagent to cross-link starch in the starch granules.

12. The method of claim 11, wherein the cross-linking reagent comprises glyoxal or epichlorohydrine.

13. The method of claim 11, wherein the starch is cross-linked to a degree of between 0.5 and 6 percent.

14. The method of claim 13, wherein the starch is cross-linked to a degree of between 1 and 3 percent.

15. The method of claim 11, wherein stabilizing the swelled starch granules further comprises contacting the swelled starch granules with a hydrophobic reagent that increases the hydrophobicity of the starch granules.

16. The method of claim 15, wherein the hydrophobic reagent is acetic anhydride or acetyl monoglyceride.

17. The method of claim 1, wherein the first liquid comprises a starch a cross-linking chemical and contacting the starch granules with the first liquids causes swelling and cross-linking to occur simultaneously.

18. The method of claim 1, wherein stabilizing the swelled starch granules comprises contacting the swelled starch granules with a hydrophobic reagent that increases the hydrophobicity of the starch granules.

19. The method of claim 18, wherein the hydrophobic reagent is acetic anhydride or acetyl monoglyceride.

20. An organic pigment comprising dried swollen starch granules having cavities filled with a gas prepared by a method comprising:

swelling starch granules by contacting the starch granules with a first liquid to provide swelled starch granules;

stabilizing the swelled starch granules; and removing the first liquid from the swelled starch granules to provide an organic pigment of dried swollen starch granules having cavities filled with a gas.

21. The organic pigment of claim 20, wherein the organic pigment is a white pigment.

22. The organic pigment of claim 20, wherein the cavities have a longitudinal shape, a diameter of between 0.1 and 8 $\mu$m, and a length of between 1 and 5 $\mu$m.

23. The organic pigment of claim 20, wherein the majority of the dried swollen starch granules have between 1 and 10 cavities per granule.

24. The organic pigment of claim 20, wherein the starch in the dried swollen starch granules is cross-linked.

25. The organic pigment of claim 24 wherein the starch in the dried swollen starch granules are cross-linked with glyoxal or epichlorohydrine.

26. The organic pigment of claim 24, wherein the starch is cross-linked to a degree of between 0.5 and 6 percent.

27. The organic pigment of claim 26, wherein the starch is cross-linked to a degree of between 1 and 3 percent.

28. The organic pigment of claim 20, wherein the dried swollen starch granules are coated with a hydrophobic reagent.

29. The organic pigment of claim 28, wherein the hydrophobic reagent is acetic anhydride or acetyl monoglyceride.

* * * * *

UNITED STATES PATENT AND TRADEMARK OFFICE
CERTIFICATE OF CORRECTION

PATENT NO.   : 6,582,509 B2
DATED        : June 24, 2003
INVENTOR(S)  : Yrjö Mälkki and Reko Lehtiliä

It is certified that error appears in the above-identified patent and that said Letters Patent is hereby corrected as shown below:

<u>Title page,</u>
Item [73], Assignee, replace the phrase "Assignee: Aveno Oy, Helsinki (FI)" with
-- Assignee: Avena Oy, Helsinki (FI) --.
Item [63], Related U.S. Application Data, "Continuation of Application No. PCT/FI00/00954, filed on Feb. 2, 2000" with -- Continuation of Application No. PCT/FI00/00954, filed on Nov. 2, 2000 --.

Signed and Sealed this

Twenty-eighth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,582,509 B2
DATED : June 24, 2003
INVENTOR(S) : Yrjö Mälkki and Reko Lehtiliä

It is certified that error appears in the above-identified patent and that said Letters Patent is hereby corrected as shown below:

<u>Title page,</u>
Item [73], please replace the phrase "Assignee: Aveno Oy, Helsinki (FI)" with
-- Assignee: Avena Oy, Helsinki (FI) --.

Signed and Sealed this

Sixteenth Day of December, 2003

JAMES E. ROGAN
*Director of the United States Patent and Trademark Office*